United States Patent [19]  
Kimura et al.

[11] 4,155,990  
[45] May 22, 1979

[54] PROCESS FOR REMOVAL AND RECOVERY OF SULFIDE FROM COAL GAS

[75] Inventors: Shoichi Kimura; Toshihiko Takahashi, both of Kudamatsu, Japan

[73] Assignee: Hitachi, Ltd., Japan

[21] Appl. No.: 866,866

[22] Filed: Jan. 4, 1978

[30] Foreign Application Priority Data

Jan. 5, 1977 [JP] Japan .................................. 52-135
Feb. 23, 1977 [JP] Japan ................................ 52-18104
Feb. 23, 1977 [JP] Japan ................................ 52-18105

[51] Int. Cl.² ........................ C01B 17/02; C10K 1/20
[52] U.S. Cl. ................................. 423/574 R; 48/272; 423/567 R
[58] Field of Search ............... 423/567, 571, 574, 576, 423/230, 231; 48/210, 212

[56] References Cited

U.S. PATENT DOCUMENTS

| 2,747,968 | 5/1956 | Pigache | 423/230 |
| 3,061,421 | 10/1962 | Landau et al. | 423/231 X |
| 3,867,110 | 2/1975 | Schora | 48/210 |
| 3,969,089 | 7/1976 | Moss et al. | 48/212 X |
| 4,035,474 | 7/1977 | Kunkel et al. | 423/574 |

FOREIGN PATENT DOCUMENTS

2365116 7/1974 Fed. Rep. of Germany ...... 423/574 G
717483 10/1954 United Kingdom .................. 423/57 X

*Primary Examiner*—G. O. Peters
*Attorney, Agent, or Firm*—Thomas E. Beall, Jr.

[57] ABSTRACT

Hydrogen sulfide is removed from coal gas for gas turbine power generation and recovered as elemental sulfur by contacting a coal gas formed by gasification of coal with an iron oxide catalyst, thereby removing hydrogen sulfide from the coal gas and obtaining a desulfurized coal gas; regenerating the iron oxide catalyst of lowered desulfurization activity, thereby obtaining a regeneration off-gas containing sulfur dioxide; converting a portion of said desulfurized coal gas to reducing gas containing hydrogen; reacting the hydrogen of the resulting reducing gas with the sulfur dioxide in a portion of said regeneration off-gas, thereby producing hydrogen sulfide; reacting the resulting hydrogen sulfide with the sulfur dioxide in the remaining portion of the regeneration off-gas in the presence of a catalyst, thereby producing a gas containing elemental sulfur, and recovering the elemental sulfur from the gas.

9 Claims, 3 Drawing Figures

PROCESS FOR REMOVAL AND RECOVERY OF SULFIDE FROM COAL GAS

LIST OF PRIOR ART REFERENCES (37 CFR 1.56(a))

The following references are cited to show the state of art.

Keshava S. Murthy: "Investigation of the removal of hydrogen sulfide at high temperature from coal gas", papers presented at the Symposium on Coal Gasification, Division of Fuel Chemistry, 170th ACS National Meeting, Chicago, Illinois, USA, August 24–29, 1975.

W. L. Farrior et al: "Regenerable Iron Oxide-Silica Sorbents for the Removal of H2S from Hot Producer Gas", papers presented at the Fourth Energy Resources Conference, University of Kentucky, Lexington, Kentucky, USA, January 6–7, 1976

U.S. Pat. No. 3,822,337

U.S. Pat. application Ser. No. 771911

Russel F. Robards et al: "Evaluation of H2S Removal Processes for Desulfurization of Coal Gas", papers presented at the Fourth Energy Resource Conference, January 7–8, 1976, University of Kentucky, Lexington, Kentucky, USA.

C.S. Goddin et al: Hydrocarbon Processing, October, 1974, pp 122–124

U.S. Pat. No. 3,702,884

U.S. Pat. No. 3,758,676

Canadian Pat. No. 938,087

This invention relates to a process for removing and recovering hydrogen sulfide from a coal gas, and more particularly to a process for removing and recovering hydrogen sulfide from a coal gas for gas turbine, which comprises removing hydrogen sulfide from the coal gas in the presence of an iron oxide catalyst, regenerating the iron oxide of lowered desulfurization activity, by oxidation, and recovering elemental sulfur from a regeneration off-gas containing sulfur dioxide.

It is the old art to produce a gaseous fuel comprising hydrogen, carbon monoxide, methane, etc. by gasification of fossil fuels.

Recently, it is recognized again to use coal as an energy source as a substitute for petroleum, and power generation systems based on coal as a fuel source have been studied and developed. In the power generation system based on the coal as the fuel source it is essential for the economy and heat efficiency of a process to operate a gas turbine by combustion of a hot gaseous fuel produced by the gasification of coal while keeping the hot coal gas at the high temperature as produced without lowering the temperature. However, sulfur naturally contained in the fossil fuel such as coal, etc. is converted to hydrogen sulfide at the gasification, and the gaseous fuel resulting from the gasification contains 100 ppm to 2–3%, ordinarily about 0.5% of hydrogen sulfide, which offers a problem to the power generation system based on a coal gas as a fuel source. That is, hydrogen sulfide is a very corrosive gas, and acts as a serious environmental pollution source. Thus, hydrogen sulfide must be removed from the coal gas before combustion in the gas turbine to protect machinary and equipment such as gas turbine from corrosion, eliminate the environmental pollution source and increase the economy of the process by recovering hydrogen sulfide as a useful material.

The removal of hydrogen sulfide from a hot gas is not limited to the fuel gas from coal as the raw material, but is required in the wide field of the gas fuel and chemical industries. However, the desulfurization of hot gas is regarded as very difficult.

In the removal of hydrogen sulfide from a hot gas a dry process based on a solid desulfurizer having granular shapes has been so far regarded as effective, and the processes using calcium carbonate, dolomites, iron oxide, etc. as the desulfurizer are known. Among these desulfurizers, iron oxide is regarded as best in the percent hydrogen sulfide removal, regeneration of deactivated desulfurizer, and economy (Keshava S. Murthy: "Investigation of the removal of hydrogen sulfide at high temperature from coal gas", papers presented at the Symposium on Coal Gasification, Division of Fuel Chemistry, 170th ACS National Meeting, Chicago, Illinois, USA, August 24–29, 1975; W. L. Farrior et al: "Regenerable iron oxide-silica sorbents for the removal of H2S from hot producer gas", papers presented at the fourth Energy Resources Conference, University of Kentucky, Lexington, Kentucky, USA, January 6–7, 1976; U.S. Pat. No. 3,822,337; U.S. patent application Ser. No. 771,911).

Iron oxide reacts with hydrogen sulfide at an elevated temperature to form iron sulfide according to the following equation (1).

$$Fe_2O_3 + 2H_2S + H_2 \rightarrow 2FeS + 3H_2O \qquad (1)$$

Iron oxide, once converted to iron sulfide, loses the capacity to remove hydrogen sulfide, and thus it is necessary to revive the capacity of removing hydrogen sulfide by regeneration. Regeneration of iron sulfide is carried out by reacting iron sulfide with oxygen or steam to return the iron sulfide to iron oxide while producing sulfur dioxide or hydrogen sulfide as a gas. The reaction of iron sulfide with oxygen or steam is represented by the following equations (2) or (3).

$$4FeS + 7O_2 \rightarrow 2Fe_2O_3 + 4SO_2 \qquad (2)$$

$$2FeS + 3H_2O \rightarrow Fe_2O_3 + 2H_2S + H_2 \qquad (3)$$

The oxidation reaction of iron sulfide represented by the equation (2) is an exothermic reaction, which releases a very large amount of the heat of reaction, whereas the reaction of iron sulfide with steam represented by the equation (3) is an endothermic reaction.

Since a mixture of iron oxide and iron sulfide has a property of being sintered at 700° C. or higher, it is necessary to conduct the regeneration of iron sulfide to iron oxide at less than 700° C. Thus, air diluted with steam is usually used as an iron sulfide regeneration gas, and to control the regeneration temperature of iron sulfide to less than 700° C. by repressing a temperature increase at the regeneration by less than 100° C. above the ordinary desulfurization temperature of 600° C., it is necessary to suppress the oxidation reaction represented by the equation (2) and proceed predominantly with the reaction with steam represented by the equation (3). However, an equilibrium concentration of hydrogen sulfide formed by the reaction represented by the equation (3) is so low that disadvantageously a large amount of steam is required for completing the iron sulfide regeneration reaction.

To prevent the sintering, it has been proposed to use a modified iron oxide catalyst by adding alumina, silica, etc. to the iron oxide catalyst to increase the regeneration temperature limit up to about 900° C. In the case of the modified iron oxide catalyst, the oxidation reaction represented by the equation (2) can be predominantly employed as the reaction to regenerate the iron sulfide to iron oxide.

The oxidation reaction of iron sulfide represented by the equation (2) proceeds at a very high reaction rate, and almost all of oxygen in the regeneration gas is consumed. From seven molecules of oxygen consumed is by-produced four molecules of sulfur dioxide, as shown by the equation (2), and thus a concentration of by-produced sulfur dioxide will be higher, and a necessary volume of the regeneration gas will be smaller, making scales of succeeding apparatuses for treating the regeneration off-gas containing by-produced sulfur dioxide smaller. The by-produced sulfur dioxide can be recovered in various forms in the succeeding process step. Concretely, sulfuric acid, gypsum, elemental sulfur, etc. are known as the ultimate products of the recovery, but the elemental sulfur is regarded as most preferable from the viewpoints of easy handling, commercial value, demand, etc. (Russell F. Robards et al: "Evaluation of $H_2S$ removal processes for desulfurization of coal gas", papers presented at the Fourth Energy Resource Conference, January 7-8, 1976, University of Kentucky, Lexington, Kentucky, USA).

In formation of elemental sulfur from sulfur dioxide by-produced by the regeneration of iron sulfide, it is known to directly reduce sulfur dioxide with methane, carbon monoxide, or carbon such as coal and cokes, where carbonyl sulfide (COS) is by-produced at the same time as the formation of elemental sulfur, and it is disadvantageously difficult to remove the carbonyl sulfide.

As another procedure, it is known to reduce a portion of the by-produced sulfur dioxide by hydrogen and form the elemental sulfur by Claus reaction of the resulting hydrogen sulfide with the remaining portion of sulfur dioxide. According to such indirect procedures, Claus reaction is however carried out at a temperature above the dew point of elemental sulfur thus formed, and consequently a conversion to the elemental sulfur is low. That is, concentrations of residual hydrogen sulfide and sulfur dioxide are disadvantageously higher.

As a technique of lowering the concentration of residual sulfur compounds, procedures for carrying out the Claus reaction at a temperature below the dew point of the elemental sulfur have been proposed (C.S. Goddin et al: Hydrocarbon Processing, October 1974, pp 122-124; U.S. Pat. No. 3,702,884; U.S. Pat. No. 3,758,676; Canadian Pat. No. 938,087). According to these procedures, the elemental sulfur is condensed and deposited on the Claus reaction catalyst, lowering the activity of the Claus reaction catalyst. To revive the activity of the catalyst, it is necessary to regenerate the catalyst and treat the resulting off-gas from the regeneration of the catalyst. Thus, there are various problems even in the formation of the elemental sulfur.

The present invention has been established to overcome the various problems encountered in the individual process steps of the prior art and provide a novel overall process for removing and recovering hydrogen sulfide from a coal gas.

An object of the present invention is to provide a process for removing and recovering hydrogen sulfide from a coal gas for gas turbine power generation, which permits to effectively remove hydrogen sulfide from a gasification coal gas, and recover sulfur dioxide by-produced at the regeneration of desulfurization iron oxide catalyst as elemental sulfur. That is, the present invention provides an economically operable power generation system based on a coal gas as a fuel source by removing hydrogen sulfide from a hot coal gas by an iron oxide catalyst, effectively conducting regeneration of the iron oxide catalyst, converted to iron sulfide predominantly by oxidation, and recovering sulfur dioxide by-produced at the regeneration of the catalyst by oxidation as elemental sulfur.

The present process comprises a step of gasifying coal, a step of removing hydrogen sulfide from the coal gas by contact with an iron oxide catalyst, a step of regenerating the iron oxide catalyst of lowered desulfurization activity and forming a regeneration off-gas containing sulfur dioxide, a step of converting a portion of the desulfurized coal gas free from hydrogen sulfide to a reducing gas containing hydrogen, a step of reacting the hydrogen of said reducing gas with sulfur dioxide of a portion of the regeneration off-gas formed at said regeneration of the iron oxide catalyst, thereby forming hydrogen sulfide, and a step of reacting said hydrogen sulfide with the sulfur dioxide of the remaining portion of the regeneration off-gas, thereby forming elemental sulfur, and recovering it.

According to one embodiment of the present invention, elemental sulfur is formed and recovered by reacting the hydrogen sulfide thus formed with sulfur dioxide in the remaining portion of the regeneration off-gas in the presence of a Claus reaction catalyst at a temperature above the dew point of elemental sulfur according to Claus reaction, cooling a Claus reaction off-gas down to the dew point of the elemental sulfur, thereby separating the elemental sulfur from the Claus reaction off-gas by condensation, and recycling the condensation off-gas to the step of gasifying coal (closed system). The Claus reaction and condensation-separation of the elemental sulfur can be carried out in a plurality of stages.

According to another embodiment of the present invention, hydrogen sulfide and sulfur dioxide remaining in the condensation off-gas is further subjected to Claus reaction at a temperature below the dew point of the elemental sulfur to form the elemental sulfur without recycling the condensation off-gas to the step of gasifying the coal, and the formed elemental sulfur is condensed and deposited on the Clause reaction catalyst. The Clause reaction catalyst of lowered activity due to the condensation and deposition of the elemental sulfur is regenerated by oxidation with air or gas turbine outlet gas (combustion gas), and the Claus reaction catalyst-regeneration off-gas containing sulfur dioxide by-produced at the regeneration of Claus reaction catalyst is joined by recycle into the regeneration off-gas containing sulfur dioxide by-produced at the regeneration of the iron oxide catalyst, and ultimately subjected to the step of recovering elemental sulfur. Off-gas from the Claus reaction at the temperature below the dew point of the elemental sulfur can be vented to the atmosphere without recycle (open system).

According to other embodiment of the present invention, said Claus reaction catalyst of lowered activity due to the condensation and deposition of the elemental sulfur by conducting the Claus reaction at the temperature below the dew point of the elemental sulfur can be regenerated with the Claus reaction off-gas freed from the elemental sulfur formed at the temperature below the dew point through the separation by condensation. That is, the Claus reaction off-gas is heated and contacted with the Claus reaction catalyst of lowered activity to release the deposited elemental sulfur and regenerate the Claus reaction catalyst. The heated off-gas containing the released elemental sulfur is cooled to separate the entrained elemental sulfur by condensation, and vented to the atmosphere (open system).

Now, the present invention will be described in detail, referring to several embodiments of the present invention shown in the accompanying drawings.

Figure 1:
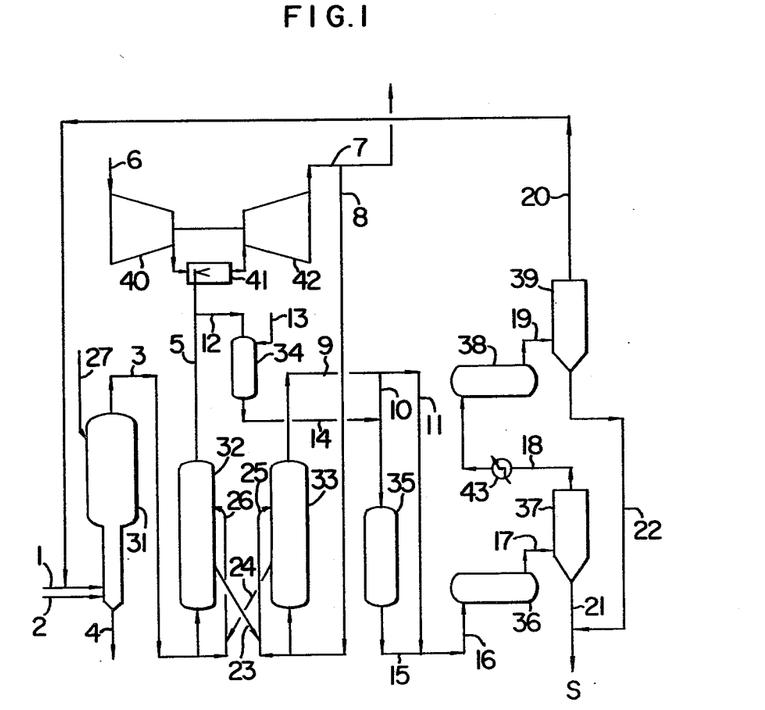
FIG. 1 is a flowdiagram of a gas turbine power generation system showing one embodiment of the present process for removing and recovering hydrogen sulfide from coal.

In FIG. 1, coal 27 is gasified with air 1 and steam 2 in a gasification furnace 31, and a hot coal gas 3 is produced while separating ashes 4 from the coal gas. The hot coal gas 3 is contacted with an iron oxide catalyst in a fluidized bed type desulfurizer 32 to remove hydrogen sulfide from the hot coal gas. The resulting desulfurized hot coal gas 5 is led to a combustor 41 of gas turbine 42, where the hot coal gas is combusted with air 6 compressed by a compressor 40, and makes revolution of the gas turbine 42, and leaves the gas turbine 42 as a hot gas turbine outlet gas (combustion gas) 7. A major portion of the gas turbine outlet gas 7 is led to a waste heat recovery boiler (not shown in the drawing) to recover the heat therefrom, but a portion 8 of the gas turbine outlet gas is used for regeneration of the iron oxide catalyst of lowered desulfurization activity. In the desulfurizer 32, the iron oxide catalyst reacts with hydrogen sulfide to form iron sulfide, and a portion of the catalyst of lowered desulfurization activity due to the formation of the iron sulfide is withdrawn from the desulfurizer 32 through a line 23, and pneumatically conveyed into a fluidized bed-type catalyst regenerator 33 for the iron oxide catalyst by a portion 25 of the hot gas turbine outlet gas 8. In the catalyst regenerator 33, the iron oxide catalyst, partly converted to the sulfide, is oxidized by the gas turbine outlet gas 8, and regenerated. A portion of the iron oxide catalyst regenerated in the catalyst regenerator 33 is withdrawn through a line 24, and pneumatically returned to the desulfurizer 32 through a line 26 by a portion of the coal gas 3.

The regeneration off-gas containing sulfur dioxide by-produced at the regeneration reaction of the iron oxide catalyst is withdrawn from the catalyst regenerator 33 through a line 9. A portion of the coal gas 5 freed from hydrogen sulfide in the desulfurizer 32 is withdrawn through a line 12, and led to a shift converter 34 together with steam 13. In the shift converter 34, carbon monoxide contained in the coal gas reacts with steam over a catalyst filled in the shift converter 34 to form hydrogen and carbon dioxide. The portion of the coal gas subjected to the removal of carbon monoxide and the enhancement of hydrogen concentration in the shift converter 34 is led to a $SO_2$ reduction reactor 35 as a reducing gas 14 together with a portion 10 of the regeneration off-gas 9 containing the by-produced sulfur dioxide. In the reduction reactor 35, sulfur dioxide reacts with hydrogen over a catalyst filled therein to form hydrogen sulfide.

The resulting reduction off-gas 15 containing hydrogen sulfide and the remaining portion 11 of the regeneration off-gas containing the by-produced sulfur dioxide are led to a first Claus reactor 36 filled with a Claus reaction catalyst. In the first Claus reactor 36, hydrogen sulfide reacts with sulfur dioxide to form elemental sulfur. Off-gas 17 containing the thus formed elemental sulfur is led from the first Claus reactor 36 to a first sulfur condenser 37, where condensed elemental sulfur 21 is separated, and then the off-gas 18 from the condenser 37 is heated by a heater 43 and led to a second Claus reactor 38 filled with a Claus reaction catalyst, where the remaining hydrogen sulfide and sulfur dioxide from the first Claus reactor 36 are subjected to reaction to form elemental sulfur. Off-gas 19 from the second Claus reactor 38 is led to a second sulfur condenser 39, where the elemental sulfur 22 is separated by condensation, and condensation off-gas from the second sulfur condenser is returned to the gasification furnace 31 through a line 20 after joining with the air 1 for the coal gasification.

Figure 2:
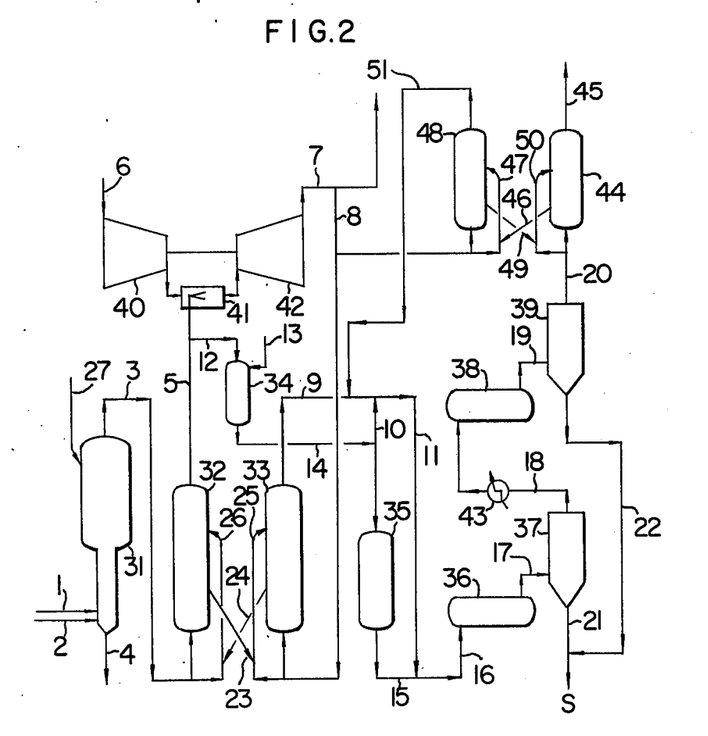
FIGS. 2 and 3 are flow diagrams of other embodiments of the present invention.

In FIG. 2, another mode of carrying out the present invention is shown, where the off-gas 20 from the second sulfur condenser 39, the last step of the mode of practice shown in FIG. 1, the condensation off-gas 20 still containing residual hydrogen sulfide and sulfur dioxide, is further led to a fluidized bed-type third Claus reactor 44 without returning the condensation off-gas 20 to the gasification furnace 31, differently from the mode of practice shown in FIG. 1.

In the third Claus reactor 44, hydrogen sulfide reacts with sulfur dioxide at a temperature below the dew point of the elemental sulfur thus formed. Off-gas 45 from the thrid Claus reactor 44 contains sulfur only in an amount corresponding to the saturated vapor pressure of the elemental sulfur at the reaction temperature prevailing in the third Claus reactor 44. The resulting elemental sulfur condenses the deposits onto the Claus reaction catalyst in the fluidized state in the third Claus reactor 44. The Claus reaction catalyst of lowered activity due to the deposition of the formed elemental sulfur is partly withdrawn from the third Claus reactor 44 through a line 46, and pneumatically conveyed into a Claus reaction catalyst regenerator 48 through a line 47 by a portion 8 of the hot gas turbine outlet gas 7. In the Claus reaction catalyst regenerator 48, particles of the Claus reaction catalyst are brought into contact with the portion 8 of the gas turbine outlet gas in a hot fluidized state, and the elemental sulfur condensed and deposited on the Claus reaction catalyst is oxidized to sulfur dioxide and released from the catalyst, whereby the Claus reaction catalyst is regenerated.

The Claus reaction catalyst regenerated in the Claus reaction catalyst regenerator 48 is partly withdrawn from the regenerator through a line 49, and is pneumatically returned to the third Claus reactor 44 through a line 50 by a portion of the condensation off-gas 20.

Off-gas 51 containing sulfur dioxide generated at the regeneration of the Claus reaction catalyst in the Claus reaction catalyst regenerator 48 is joined with the regeneration off-gas 9 from the catalyst regenerator 33, which contains sulfur dioxide by-produced at the regeneration of the iron oxide catalyst.

Figure 3:
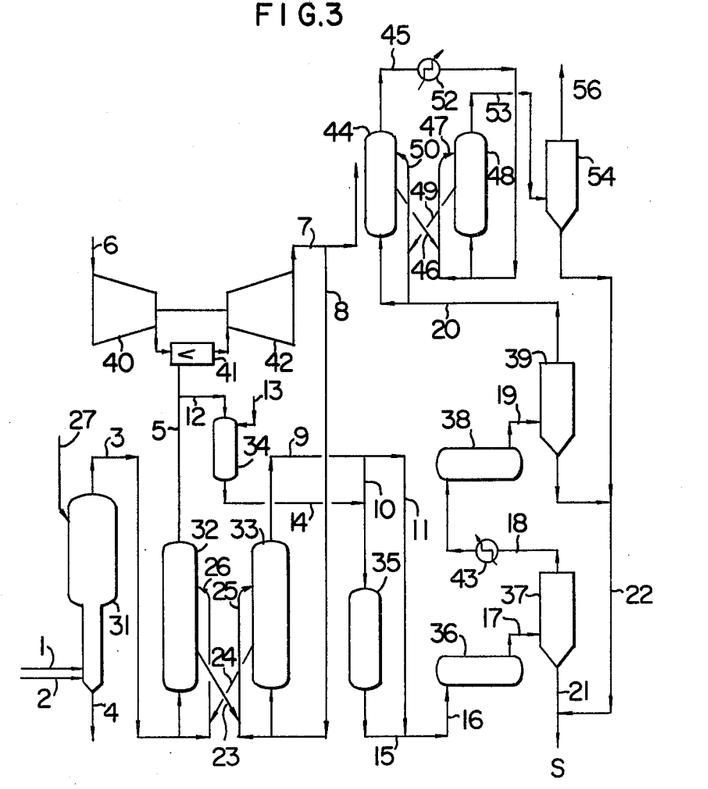

In FIG. 3, other embodiment of modes of carrying out the present invention is shown, where the regeneration of the Claus reaction catalyst of lowered activity due to the deposition of the elemental sulfur formed in the third Claus reactor 44 is carried out with the off-gas 45 from the third Claus reactor 44 without using the portion 8 of the gas turbine outlet gas 7, differently from the mode of practice shown in FIG. 2. That is, the Claus reaction catalyst of lowered activity due to the condensation and deposition of the elemental sulfur thereon in the third Claus reactor 44 is partly withdrawn through the line 46, and pneumatically conveyed to the Claus reaction catalyst regenerator 48 through the line 47 by a portion of a hot gas obtained by heating the off-gas 45 from the third Claus reactor 44 by a heater 52. In the Claus reaction catalyst regenerator 48, particles of the Claus reaction catalyst are brought into contact with the heated off-gas in a fluidized hot state, and the elemental sulfur condensed and deposited on the Claus reaction catalyst is vaporized and released from the catalyst, whereby the Claus reaction catalyst is regenerated.

The Claus reaction catalyst regenerated in the Claus reaction catalyst regenerator 48 is partly withdrawn through the line 49 and pneumatically returned to the third Claus reactor 44 through the line 50 by a portion of the condensation off-gas 20.

Off-gas 53 containing the elemental sulfur vaporized and released at the regeneration of the Claus reaction catalyst in the Claus reaction catalyst regenerator 48 is cooled in a third sulfur condenser 54 to separate the entrained sulfur by condensation. Condensation off-gas 56 freed from the condensed sulfur is vented to the atmosphere.

The present process for removing and recovering hydrogen sulfide as elemental sulfur from a coal gas for turbine power generation is embodied in the flow schemes as described above, and the above embodiments of the presnt process will be detailed with concrete examples of numerical values below:

The coal gas 3 produced in the gasification furnace 31 has a composition shown in the following Table 1.

Table 1

| Component | $N_2$ | CO | $H_2$ | $H_2O$ | $CO_2$ | $CH_4$ |
|---|---|---|---|---|---|---|
| Concentration (%) | 50 | 23 | 8 | 8 | 5 | 5 |

The coal gas 3 contains 5000 ppm hydrogen sulfide.

The gas turbine outlet gas 7 (combustion gas) resulting from removal of hydrogen sulfide from the coal gas 3 and combustion of the desulfurized coal gas 5 in the combustor 41 has a temperature of 535° C. and a composition shown in the following Table 2.

Table 2

| Component | $N_2$ | $O_2$ | $CO_2$ | $H_2O$ |
|---|---|---|---|---|
| Concentration (%) | 77 | 14 | 5 | 4 |

The regeneration off-gas 9 containing sulfur dioxide obtained by the regeneration of the iron oxide catalyst by oxidation in the catalyst regenerator 33 using the portion 8 of the hot gas turbine outlet gas 7 having a temperature of 535° C. has a composition shown in the following Table 3.

Table 3

| Component | $N_2$ | $SO_2$ | $CO_2$ | $H_2O$ |
|---|---|---|---|---|
| Concentration (%) | 81.9 | 8.5 | 5.3 | 4.3 |

The temperature of the catalyst regenerator 33 is 850° C., and the limit temperature of the modified iron oxide catalyst is 900° C., and thus no sintering of iron oxide and iron sulfide takes place. The necessary amount of the gas for the catalyst regeneration is 0.6% of the gas turbine outlet gas 7.

A portion 12 of the desulfurized coal gas 5 having the composition shown in Table 2 is led to the shift converter 34, and contacted with steam 13. The resulting reducing gas 14 has a composition shown in the following Table 4.

Table 4

| Component | $N_2$ | $H_2$ | $CO_2$ | $H_2O$ | Others |
|---|---|---|---|---|---|
| Concentration (%) | 37 | 23 | 21 | 15 | 4 |

The reducing gas 14 has a hydrogen concentration about three times as high as that of the coal gas, and contains no carbon monoxide. Thus, the resulting reducing gas has a good hydrogen reduction action upon sulfur dioxide, and produces no noxious by-products such as carbonyl sulfide, etc.

The reaction to produce elemental sulfur from sulfur dioxide and hydrogen sulfide proceeds according to the following equation (4):

$$SO_2 + 2H_2S \rightarrow 3S + 2H_2O \qquad (4)$$

That is, two molecules of hydrogen sulfide is necessary for one molecule of sulfur dioxide. Two-thirds of the by-produced sulfur dioxide contained in the regeneration off-gas 9 is converted to hydrogen sulfide, and the remaining one-third is retained as unreacted. The necessary hydrogen for the conversion of two-thirds of the by-produced sulfur dioxide to hydrogen sulfide is supplied by the hydrogen contained in the reducing gas 14 having the composition shown in Table 4, and the coal gas withdrawn through the line 12 for producing the reducing gas is 3.5% of total coal gas.

The conversion of sulfur dioxide to hydrogen sulfide by hydrogen reduction is conducted in the presence of molybdenum catalyst at 350° C.

A portion of the by-produced sulfur dioxide is converted to hydrogen sulfide, which is then mixed with the remaining sulfur dioxide. The resulting gas 16 having a composition shown in the following Table 5 is led to the first Claus reactor 36.

Table 5

| Component | $N_2$ | $H_2O$ | $CO_2$ | $H_2S$ | $SO_2$ | Others |
|---|---|---|---|---|---|---|
| Concentration (%) | 63.7 | 15.9 | 12.7 | 3.2 | 1.6 | 2.8 |

Hydrogen sulfide and sulfur dioxide of the gas 16 having the composition of Table 5 are subjected to reaction to form elemental sulfur in the first Claus reactor 36, giving off the off-gas 17 having a composition shown in the following Table 6. The reaction temperature of the Claus reactor 36 is controlled to 218° C., which is above the dew point of the formed elemental sulfur.

Table 6

| Component | $N_2$ | $H_2O$ | $CO_2$ | $H_2S$ | $SO_2$ | S | Others |
|---|---|---|---|---|---|---|---|
| Concentration (%) | 64.0 | 19.2 | 12.8 | 0.4 | 0.2 | 0.5* | 2.8 |

(*in terms of $S_8$)

The off-gas 17 from the first Claus reactor is subjected to the separation of the elemental sulfur by condensation in the first sulfur condenser 37, and the condensation off-gas 18 having a composition shown in the following Table 7 is obtained. Temperature of the off-gas 18 from the first sulfur condenser 37 is 100° C.

Table 7

| Component | $N_2$ | $H_2O$ | $CO_2$ | $H_2S$ | $SO_2$ | S | Others |
|---|---|---|---|---|---|---|---|
| Concentration (%) | 64.3 | 19.3 | 12.9 | 0.4 | 0.2 | — | 2.8 |

The off-gas 18 having the composition of Table 7 is heated and led to the second Claus reactor 38, where hydrogen sulfide reacts with sulfur dioxide at 190° C. to form the elemental sulfur. The off-gas from the second Claus reactor 38 has a composition shown in the following Table 8.

Table 8

| Component | $N_2$ | $H_2O$ | $CO_2$ | $H_2S$ | $SO_2$ | S | Others |
|---|---|---|---|---|---|---|---|
| Concentration (%) | 64.4 | 19.3 | 12.9 | 0.032 | 0.016 | 0.07* | 2.8 |

(*: in terms of $S_8$)

The off-gas 19 having the composition of Table 8 is cooled to 60° C. in the second sulfur condenser 39 to separate the elemental sulfur 22 by condensation, and the condensation off-gas 20 having a composition shown in the following Table 9 is obtained.

Table 9

| Component | $N_2$ | $H_2O$ | $CO_2$ | $H_2S$ | $SO_2$ | S* | Others | Total sulfur |
|---|---|---|---|---|---|---|---|---|
| Concentration (%) | 64.7 | 19.4 | 12.9 | 360** | 180** | 13** | 2.8 | 500*** |

(*: in ppm; : in terms of $S_8$; *: in ppm in terms of sulfur atom)

The condensation off-gas 20 containing 500 ppm total sulfur is returned to the gasification furnace 31 after joining with the air 1 in FIG. 1. Increase in sulfur content of the coal gas by returning the condensation off-gas 20 containing sulfur compounds and sulfur to the gasification furnace 31 is 0.6%.

In FIG. 2, the condensation off-gas 20 having the composition of Table 9 is further led to the third Claus reactor 44, where hydrogen sulfide reacts with sulfur dioxide at 60° C. which is below the dew point of the elemental sulfur, and the off-gas 45 evolving from the third Claus reactor 44 has a composition shown in the following Table 10.

Table 10

| Component | $N_2$ | $H_2O$ | $CO_2$ | Total sulfur | Others |
|---|---|---|---|---|---|
| Concentration (%) | 64.8 | 19.4 | 12.9 | 8* | 2.8 |

(*in ppm in terms of sulfur atom)

The Claus reaction catalyst deposited with condensed elemental sulfur is regenerated with the portion 8 of the gas turbine outlet gas having the composition of Table 2 by oxidation in the Claus catalyst regenerator 48, and the resulting off-gas 51 contains sulfur dioxide, as shown in the following Table 11.

Table 11

| Component | $N_2$ | $SO_2$ | $CO_2$ | $H_2O$ |
|---|---|---|---|---|
| Concentration (%) | 77 | 14 | 5 | 4 |

Increase in flow rate of the regeneration off-gas 9 containing sulfur dioxide at the regeneration of the iron oxide catalyst by returning the off-gas 51 containing sulfur dioxide by-produced at the regeneration of the Claus reaction catalyst is only 0.7%.

In FIG. 3, the Claus reaction catalyst deposited with the condensed elemental sulfur is heated in the Claus reaction catalyst regenerator 48 by the off-gas 45 heated to 450° C. to vaporize and release the deposited sulfur, and regenerated. The off-gas 53 containing the vaporized and released sulfur is cooled to 60° C. in the third sulfur condenser 54 to separate the entrained sulfur by condensation, and the condensation off-gas 56 containing only 8 ppm sulfur as total sulfur shown in Table 12 is vented from the third sulfur condenser to the atmosphere.

Table 12

| Component | $N_2$ | $H_2O$ | $CO_2$ | Total sulfur | Others |
|---|---|---|---|---|---|
| Concentration (%) | 64.8 | 19.4 | 12.9 | 8* | 2.8 |

(*in ppm in terms of sulfur atom)

Operating conditions of the present process for removing and recovering hydrogen sulfide according to the flow scheme of FIG. 1 are shown in the following Tables 13 and 14 for 500,000 kW power generation as an example.

Table 13

| Reference numerals corresponding to those in FIG. 1 | Item | Flow rate | |
|---|---|---|---|
| 1 | Air | $388.89 \times 10^3$ | $Nm^3/hr$ |
| 2 | Steam | 826.22 | ton/day |
| 3 | Coal gas* | $1,090.14 \times 10^3$ | $Nm^3/hr$ |
| 5 | Desulfurized coal gas | $1,090.14 \times 10^3$ | $Nm^3/hr$ |
| 6 | Combustion air | $1,998.69 \times 10^3$ | $Nm^3/hr$ |
| 7 | Gas turbine outlet gas | $2,547.99 \times 10^3$ | $Nm^3/hr$ |
| 8 | Regneration gas | $115.04 \times 10^3$ | $Nm^3/hr$ |
| 9 | Regeneration off-gas | $112.55 \times 10^3$ | $Nm^3/hr$ |
| 14 | Reducing gas | $24.68 \times 10^3$ | $Nm^3/hr$ |
| 16 | Gas for Claus reaction | $134.98 \times 10^3$ | $Nm^3/hr$ |
| 21 + 22 | Recovered sulfur | $5,175 \times 10^3$ | kg/hr |
| 20 | Recycle gas | $115.01 \times 10^3$ | $Nm^3/hr$ |
| 27 | Coal | 4166.7 | ton/day |

Note: *Coal gas the following composition in percent;

| | |
|---|---|
| CO | 15.484 |
| $CO_2$ | 9.628 |
| $H_2$ | 12.804 |
| $CH_4$ | 2.462 |
| $N_2$ | 48.437 |
| $H_2O$ | 10.420 |
| $H_2S$ | 0.310 |
| COS | 0.029 |
| $NH_3$ | 0.370 |
| HCN | 0.044 |
| RN | 0.012 |
| Total | 100.000 |

Table 14

| Reference numerals corresponding to those in Figure 1 | Item | Catalyst | Temp. | Pressure |
|---|---|---|---|---|
| 32 | Desulfurizer | Modified Iron | 650° C. | 16 atm |

Table 14-continued

| Reference numerals corresponding to those in Figure 1 | Item | Catalyst | Temp. | Pressure |
|---|---|---|---|---|
| 33 | Regenerator | | 800° C. | 1 atm |
| 34 | Shift converter | Iron catalyst | 400° C. | 1 atm |
| 35 | SO$_2$ reduction reactor | Cobalt-Molybdenum catalyst | 350° C. | 1 atm |
| 36 | First Claus reactor | Claus catalyst | 200° C. | 1 atm |
| 38 | Second Claus reactor | Claus catalyst | 172° C. | 1 atm |

In the foregoing description, explanation has been made of the fluidized bed-type desulfurizer and catalyst regenerator, but moving bed-type desulfurizer and regenerator can be, of course, employed. Desulfurizer and regenerator of fixed bed-type can be also employed by switching desulfurization and regeneration operations alternatively therebetween.

When a coal gas has a high hydrogen concentration and a low carbon monoxide concentration, the shift converter serving to convert carbon monoxide in the coal gas to hydrogen and carbon dioxide by steam, as described above, will not be required, and such coal gas can be utilized directly as the reducing gas for the by-produced sulfur dioxide. Of course, other hydrogen source than the coal gas can be utilized.

The step of converting a portion of the by-produced sulfur dioxide to hydrogen sulfide, the essential step of the present process for removing and recovering hydrogen sulfide from the coal gas can receive all of the regenration off-gas containing the by-produced sulfur dioxide from the catalyst regenerator without any branching of the regeneration off-gas by adjusting a conversion of the by-produced sulfur dioxide to hydrogen sulfide, and a ratio of the formed hydrogen sulfide to the residual sulfur dioxide can be controlled to the most suitable ratio for the successive Claus reaction.

The step of forming elemental sulfur at a temperature above the dew point of the elemental sulfur according to Claus reaction, and then cooling the off-gas containing the elemental sulfur to a temperature below the dew point to separate the sulfur from the off-gas by condensation can be carried out in a plurality of stages as desired.

The generation of the iron oxide catalyst can be carried out by air or gas turbine outlet gas, but the air or gas turbine outlet gas can be diluted with steam, etc., if desired, to control temperature at the regeneration by oxidation.

The regeneration of Claus reaction catalyst can be also carried out by air, and, if necessary, by air or gas turbine outlet gas diluted with steam, etc. to control temperature at the regeneration by oxidation.

In place of the fluidized bed type third Claus reactor and Claus reaction catalyst regenerator used in embodiments of the present invention, moving bed type reactor and regenerator can be employed. Furthermore, the reactor and regenerator of fixed bed type can be used where the Claus reaction and regeneration by oxidation can be switched alternately.

As described above, the present process for removing and recoving hydrogen sulfide from a coal gas comprises gasifying coal, reacting the resulting coal gas with an iron oxide catalyst to remove hydrogen sulfide from the coal gas, converting a portion of the desulfurized coal gas to a reducing gas containing hydrogen, subjecting the resulting reducing gas and a portion of regeneration off-gas containing sulfur dioxide by-produced at the regeneration of said iron oxide catalyst to hydrogen reduction to form hydrogen sulfide, and reacting the resulting hydrogen sulfide with other portion of the regeneration off-gas containing sulfur dioxide to form the resulting elemental sulfur and recover it, and thus the hydrogen sulfide contained in the coal gas can be removed, and also the sulfur dioxide by-produced at the regeneration of the iron oxide catalyst used in the desulfurization can be effectively recovered as the elemental sulfur according to the present invention.

That is, the hydrogen sulfide contained in the coal gas can be removed at an elevated temperature, and recovered as the elemental sulfur by a small volume of treating gas with a high percent recovery, and thus a coal gasification-power generation system can be effectively operated at a high heat efficiency without any fear of environmental pollution according to the present invention.

What is claimed is:

1. A process for removing and recovering hydrogen sulfide from a coal gas for gas turbine power generation, which comprises:
    (1) a step of gasifying coal, thereby forming a coal gas,
    (2) a step of contacting the resulting coal gas with an iron oxide catalyst, thereby removing hydrogen sulfide from the coal gas and forming iron sulfide,
    (3) a step of regenerating the iron oxide catalyst of step (2) of lowered desulfurization activity by oxidizing said iron sulfide to iron oxide thereby forming a regeneration off-gas containing sulfide dioxide,
    (4) a step of converting a portion of the desulfurized coal gas from the step (2) to a reducing gas containing hydrogen by reacting said coal gas with steam,
    (5) a step of reacting hydrogen in the reducing gas from the step (4) with sulfur dioxide in a portion of the regeneration off-gas from the step (3), thereby forming hydrogen sulfide, and
    (6) a step of reacting hydrogen sulfide from the step (5) with sulfur dioxide in the other portion of the regeneration off-gas from the step (3) in the presence of a catalyst, thereby forming a gas containing elemental sulfur, and recovering the elemental sulfur from the gas.

2. A process according to claim 1, wherein the remaining portion of the desulfurized coal gas from the step (2) is used as a fuel for gas turbine for power generation, and a portion of gas turbine outlet gas is used for the regeneration of the iron oxide catalyst in the step (3).

3. A process according to claim 2, wherein a portion of the iron oxide catalyst of lower desulfurization activity in the step (2) is pneumatically transferred to the step (3) by the gas turbine outlet gas.

4. A process according to claim 2, wherein a portion of the iron oxide catalyst regenerated in the step (3) is pneumatically transferred to the step (2) by the coal gas from the step (1).

5. A process according to claim 1, wherein carbon monoxide contained in the portion of desulfurized coal gas from the step (2) is made to react with steam over a catalyst in the step (4), thereby forming the reducing gas containing hydrogen.

6. A process according to claim 1, wherein the gas containing the elemental sulfur in the step (6) is subjected at least once to separation by condensation, thereby recovering the elemental sulfur.

7. A process according to claim 6, wherein an off-gas separated by condensation of the elemental sulfur is recycled to the step (1).

8. A process according to claim 6, wherein the off-gas separated by condensation of the elemental sulfur is subjected to reaction at a temperature below dew point of the elemental sulfur in the presence of a catalyst, thereby reacting the remaining hydrogen sulfide and sulfur dioxide with each other in the off-gas and forming elemental sulfur, the catalyst of lowered activity due to condensation and deposition of the elemental sulfur is regenerated by air or a portion of the gas turbine outlet gas by oxidation, and an off-gas containing by-produced sulfur dioxide is joined into the regeneration off-gas from the step (3).

9. A process according to claim 8, wherein the calayst of lowered activity is regenerated by the off-gas resulting from the reaction of the remaining hydrogen sulfide and sulfur dioxide at the temperature below the dew point of the elemental sulfur, after the off-gas is heated, and the resulting off-gas containing the elemental sulfur is cooled, thereby recovering the elemental sulfur by condensation.

* * * * *